United States Patent [19]

Altenburg

[11] 4,251,198
[45] Feb. 17, 1981

[54] CUTTER HUB WITH REPLACEABLE KNIFE BLADES FOR UNDERWATER PELLETIZER

[75] Inventor: Hovey S. Altenburg, Tamaqua, Pa.

[73] Assignee: Gala Industries, Inc., Eagle Rock, Va.

[21] Appl. No.: 34,140

[22] Filed: Apr. 27, 1979

[51] Int. Cl.³ ............................................. B29C 17/14
[52] U.S. Cl. ................................... 425/67; 83/675;
264/142; 425/196; 425/311; 425/313
[58] Field of Search ............... 425/313, 311, 67, 69,
425/182, 186, 192 R, 196, 382 R; 264/142;
83/675

[56] References Cited

U.S. PATENT DOCUMENTS

| 1,027,537 | 5/1912 | Haldeman | 83/675 |
|---|---|---|---|
| 1,525,025 | 2/1925 | Dahl et al. | 83/591 |
| 2,739,647 | 3/1956 | Coste | 164/61 |
| 3,292,212 | 12/1966 | Pomper | 425/67 |
| 3,333,298 | 8/1967 | List et al. | 425/313 |
| 3,337,913 | 8/1967 | List | 425/313 |
| 3,792,950 | 2/1974 | Cuff | 425/313 |
| 3,831,482 | 8/1974 | Eichler et al. | 83/675 |
| 4,123,207 | 10/1978 | Dudley | 425/67 |

Primary Examiner—Jeffery R. Thurlow
Attorney, Agent, or Firm—Clarence A. O'Brien; Harvey B. Jacobson

[57] ABSTRACT

A cutter hub for use in an underwater pelletizer such as disclosed in U.S. Pat. No. 4,123,207, issued Oct. 31, 1978, which includes a replaceable, double or single edged blade attached to each arm of the hub with a major portion of the length of the blade being attached to and supported by the arm on the hub thereby resulting in less axial deflection with increased cutting pressure, since the rigid hub arm carries the rotational stress without deflection of the critical blade cutting surface. This arrangement produces higher quality pellets, fewer knife adjustments, reduces the radial wear pattern on the pellet die plate, permits the use of thinner, less costly blades and permits the use of single edged or double-edged blade with a useable second side.

9 Claims, 4 Drawing Figures

CUTTER HUB WITH REPLACEABLE KNIFE BLADES FOR UNDERWATER PELLETIZER

BACKGROUND OF THE INVENTION

1. Field of the Invention

The present invention generally relates to a cutter hub employed in a pelletizer in which pellets are extruded through a die plate and blades on the cutter hub moving along the surface of the die plate will sever the pellets, the improvement in this invention involving the use of unique replaceable single or double-edged blades mounted on the arms on the hub with the arms engaging and supporting the blades over a major portion of their radial dimension.

2. Disclosure Statement

U.S. Pat. No. 4,123,207, issued Oct. 31, 1978, discloses an underwater pelletizer having a cutter hub with blades mounted thereon associated with a die plate to sever the pellets. Most of the blades used in this industry are generally constructed in the manner disclosed in the above patent and in U.S. Pat. No. 3,292,212 in which the blades are mounted on a central hub by bolting or otherwise securing the inner radial end of the blade to the hub or an arm thereon and allowing the radial outer end of the blade to float along the surface of the die plate. The drive force of the motor is transmitted to the blades through the shaft and hub and the normal shearing action of the material when severing the pellets causes the outer radial end portions of the blades to deflect away from or bend away from the die plate with the lifting off of the blade in relation to the die plate causing the formation of poor pellets. Other U.S. patents disclosing somewhat related structures are U.S. Pat. Nos. 1,027,537; 1,525,025; 2,739,647 and 3,831,482.

SUMMARY OF THE INVENTION

An object of the present invention is to provide an improved cutter hub for pelletizers such as the underwater pelletizer disclosed in U.S. Pat. No. 4,123,207 with the improvement including replaceable, single or double-edge blades mounted on outwardly extending support arms rigid with the cutter hub to orient the radially extending side cutting edges of the blades against the die plate.

Another object of the invention is to provide a cutter hub in accordance with the preceding object in which each rigid support arm extends substantially throughout the radial dimension of the blade supported thereon thereby providing for less axial deflection of the cutting blade and thereby enabling increased cutting pressure.

A further object of the invention is to provide a cutter hub in which each knife blade is provided with a beveled cutting edge along each side edge thereof to enable the blades to be reversed so that both cutting edges can be used prior to replacement of the blades, to produce higher quality pellets with fewer knife adjustments, to permit thinner, less costly blades to be used and to reduce the radial wear pattern on pellet die plates.

Still another object of the invention is to provide a cutter hub with double-edged, replaceable cutting blades with the hub including radially outwardly extending support arms engaging and supporting the blades along substantially their entire radial dimensions, which structure is quite simple to install, effective to form high quality pellets of uniform size and effective to reduce pelletizer maintenance and operation costs.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
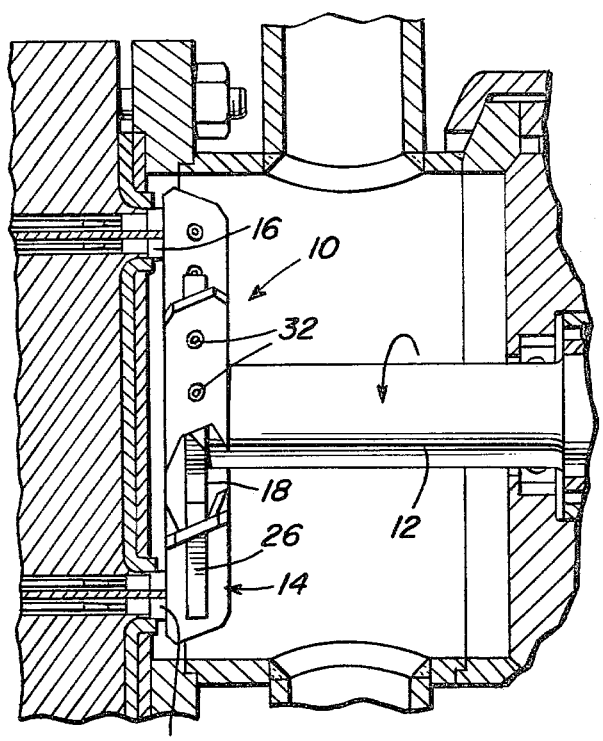
FIG. 1 is a fragmental section view illustrating the cutter hub of the present invention associated with a die plate in an underwater pelletizer.

The cutter hub 10 of the present invention is illustrated in its manner of use in FIG. 1 with the associated structure being more specifically illustrated in U.S. Pat. No. 4,123,207 with such disclosure being incorporated herein by reference to that patent. The related structure includes a shaft 12 for driving the hub 10 about the axis of the shaft so that the blades 14 on the hub 10 will move along the surface of a die plate 16 to cut off pellets being extruded through the die plate.

The hub 10 includes a generally circular hub body 18 having an internal screw thread aperture 20 located centrally therein for screw threaded mounted engagement on the screw threaded end of the drive shaft 12. The screw threaded end on the shaft 12 terminates in a shoulder against which the axial end of the hub body 18 abuts when the cutter hub 10 is screw threaded onto the shaft 12.

The cutter hub 10 includes a plurality of outwardly extending arms 26 which are circumferentially spaced equally around the hub body 18 and which extend outwardly from the hub body 18 generally in a radial direction, but in acute angular relation to a radius of the hub body which passes through the center of the hub body and the center of the inner end of an arm with the offset or angulation of the arms being in the direction of rotation of the hub body 18 when mounted on the shaft 12.

Figure 4:
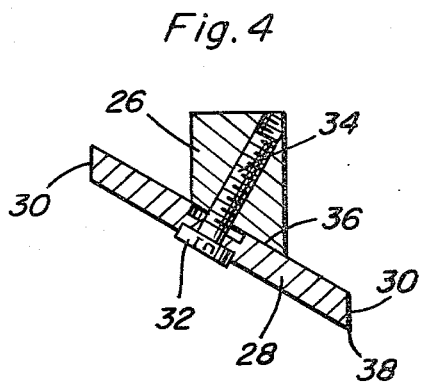
FIG. 4 is a detailed sectional view taken substantially upon a plane passing along section line 4—4 of FIG. 2 illustrating further structural details of the invention.
Figure 2:
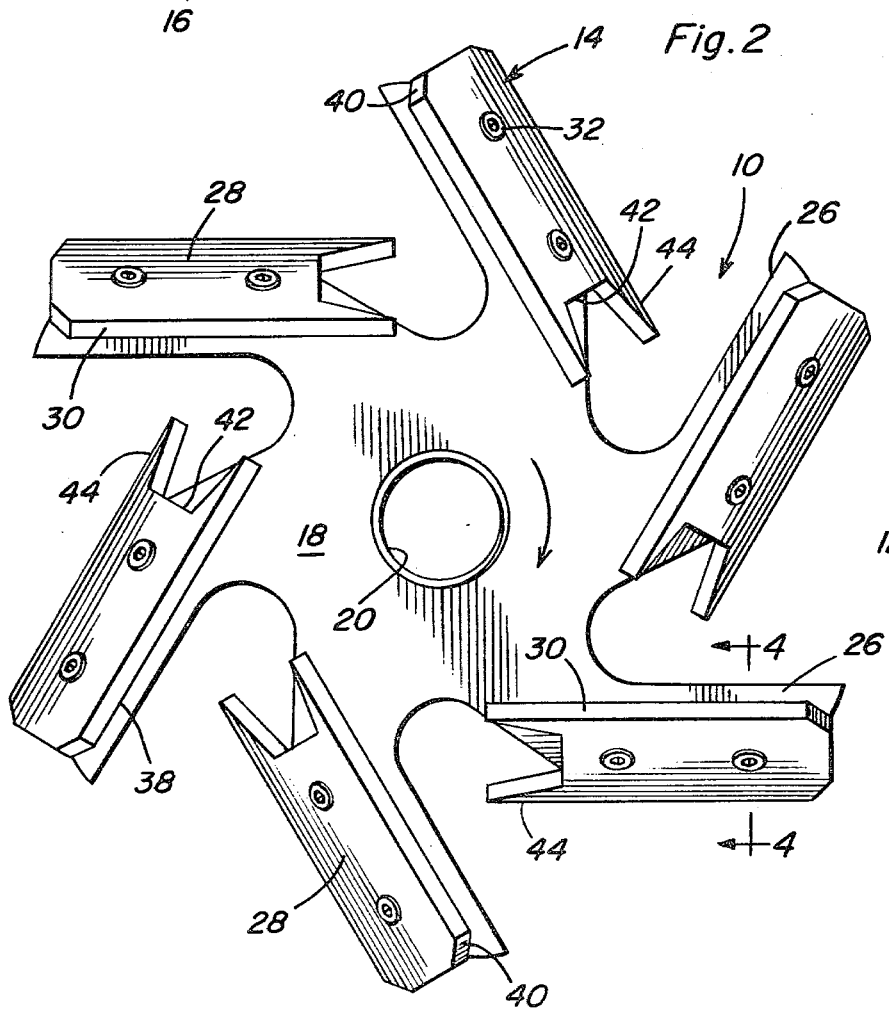
FIG. 2 is a front elevational view of the cutter hub with the double-edged, replaceable blades mounted thereon.
Figure 3:
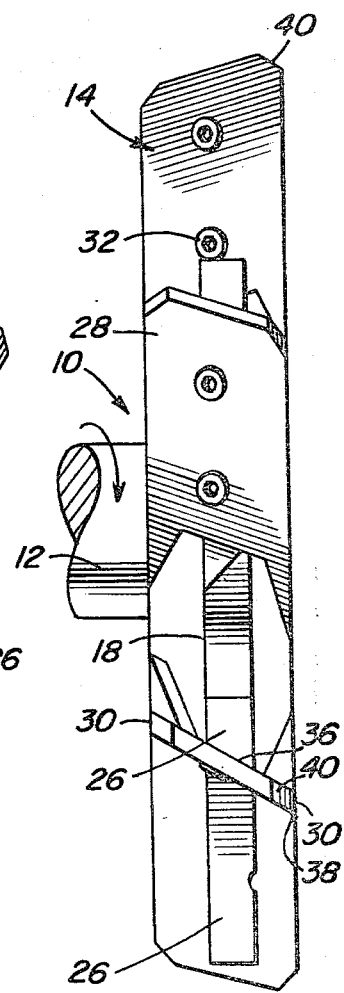
FIG. 3 is a side elevational view of the cutter hub and blades.

Each of the blades 14 is generally in the form of a relatively thin, rectangular blade or plate 28 having substantially parallel planar surfaces and substantially parallel side edges 30 which are beveled or inclined in opposite directions in relation to the planar surfaces of the plate or blade 28 as illustrated in FIG. 4. Each of the arms 26 is elongated and extends substantially throughout the length of the blade 14 mounted thereon with each blade being rigidly affixed to the arm by a pair of screw threaded fasteners 32 having a screw threaded shank 34 being received in diagonally extending internally threaded bores extending diagonally of the arm 26 from an inclined face 36 so that the plate or blade 28 will be oriented in an inclined relationship to the circular plane defined by the arms. This construction orients the beveled or inclined edges 30 in parallel relation to the die plate 16 with the leading edge of the beveled edge 30 defining an effective cutting edge 38. As illustrated in FIG. 4, the plate or blade 28 may be inverted so that either of the beveled edges 30 may be disposed against the die plate thereby providing for substantially twice the operating life of a blade before it has to be replaced. Also, as illustrated, the arm 26 extends substantially throughout the radial extent of the central portion of the blade or plate 28 and the fasteners 32 are disposed along the longitudinal center line thereof. Also, the outer corners of the blades or plates 28 are chamfered as at 40 to reduce sharpened corners coming into contact with the pellets which have been cut off and reducing turbulence. The radially inward end of each blade or plate 28 is provided with a notch or recess 42 leaving pointed side edge portions 44 which provides for elongated beveled side edges 30, reduces the weight of the blades and eliminates any interference between the inner end edges of the plates or blades 28 and the hub body 18.

This construction enables the hub diameter to be materially reduced with the arms being of one-piece construction therewith and the thickness of the hub can also be reduced thereby making it practical to provide the internally threaded bore or hole therethrough. The number of arms on the hub may be varied depending upon the customer needs and the angle of the bevel on each cutting edge of the blades may vary but is preferably 45° or 60° as shown with the corresponding surface 36 of the arms 26 also being at this same angle, so that when one cutting edge of a blade becomes worn, it is a simple matter to invert the blade so that a new cutting edge is disposed against the die plate. The arms provide an extremely rigid support for the blades and the blades are double-edged and replaceable, thereby reducing over-all operating and maintenance costs of the pelletizer. The surfaces of the arms may be curved and relieved which combined with the configuration of the blades enables the water and pellets in the underwater pelletizer to flow more freely because of the increased open area of the hub itself and the shape and configuration of the arms and blades.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A cutter hub for a pelletizer comprising a hub body adapted to be mounted on a drive shaft, a plurality of radially outwardly extending, circumferentially spaced supporting arms rigid with the hub body and a blade mounted on each of said arms and extending axially toward a die plate for cutting pellets extruded through the die plate, each blade including a beveled side edge defining a cutting edge for association with the die plate, each of said arms being elongated and engaging and supporting a blade over substantially the entire radial extent of the blade thereby rigidly supporting the blade and resisting axial deflection of the outer end portion of the blade away from the die plate.

2. The structure as defined in claim 1 wherein each cutting blade includes generally parallel side edges having oppositely beveled surfaces to define a pair of cutting edges for association with the die plate thereby enabling the two edges of the blade to be used successively as a cutting edge by inverting the blade by rotation about its longitudinal axis after one edge of the blade has become worn.

3. The structure as defined in claim 2 wherein the radially extending surface of the arm which engages the blade is inclined at an acute angle in relation to a circular plane defined by the path of movement of the arms, the side edges of the blades being oppositely beveled at the same angle whereby the side edges of the blades substantially parallel the die plate from the leading edge to the trailing edge of the blade.

4. The structure as defined in claim 3 wherein each of said arms are angulated in relation to a radius extending from the center of rotation of the hub body through the center of the inner ends of the arms with the outer end portions of the arms being circumferentially offset in the direction of rotation of the hub.

5. The structure as defined in claim 4 wherein each arm extends along the longitudinal center of the blade supported thereby to enable the blades to be inverted about their longitudinal center.

6. The structure as defined in claim 5 wherein the outer corners of each blade are chamfered, the portion on the hub body between the arms being cut away inwardly of the blades, the inner end edge of each blade including a longitudinally extending notch having a width extending over a major portion of the width of the blade to provide increased space for passages of pellets and water and reducing turbulence caused by rotation of the blades.

7. The structure as defined in claim 1 wherein said hub body is generally circular and includes an internally threaded central opening for screw threaded adjustable mounting on an externally threaded drive shaft.

8. In combination with an underwater pelletizer having a die plate with passageways arranged in generally circular configuration through which pellet forming material is extruded in an axial direction, a drive shaft generally aligned with the center of the die plate and a cutter assembly mounted on and driven by said shaft to cut pellets from one axial surface of the die plate, that improvement in which the cutter assembly comprises a hub provided with a plurality of outwardly extending arms in generally parallel relation to the die plate and extending outwardly to a point adjacent the die plate passageways, and a blade mounted on each arm and projecting axially therefrom toward the die plate, each blade including an elongated cutting edge paralleling and associated with the axial face of the die plate to cut the extruded material into pellets as the extruded material exits axially from the passageways in the die plate and the hub is rotated.

9. The combination as defined in claim 8 wherein each blade includes a pair of generally parallel cutting edges, said arm extending along a major portion of the length of each blade along a centerline between the cutting edges so that either cutting edge can be associated with the die plate by inverting the blade along the centerline.

* * * * *